Patented Apr. 19, 1949

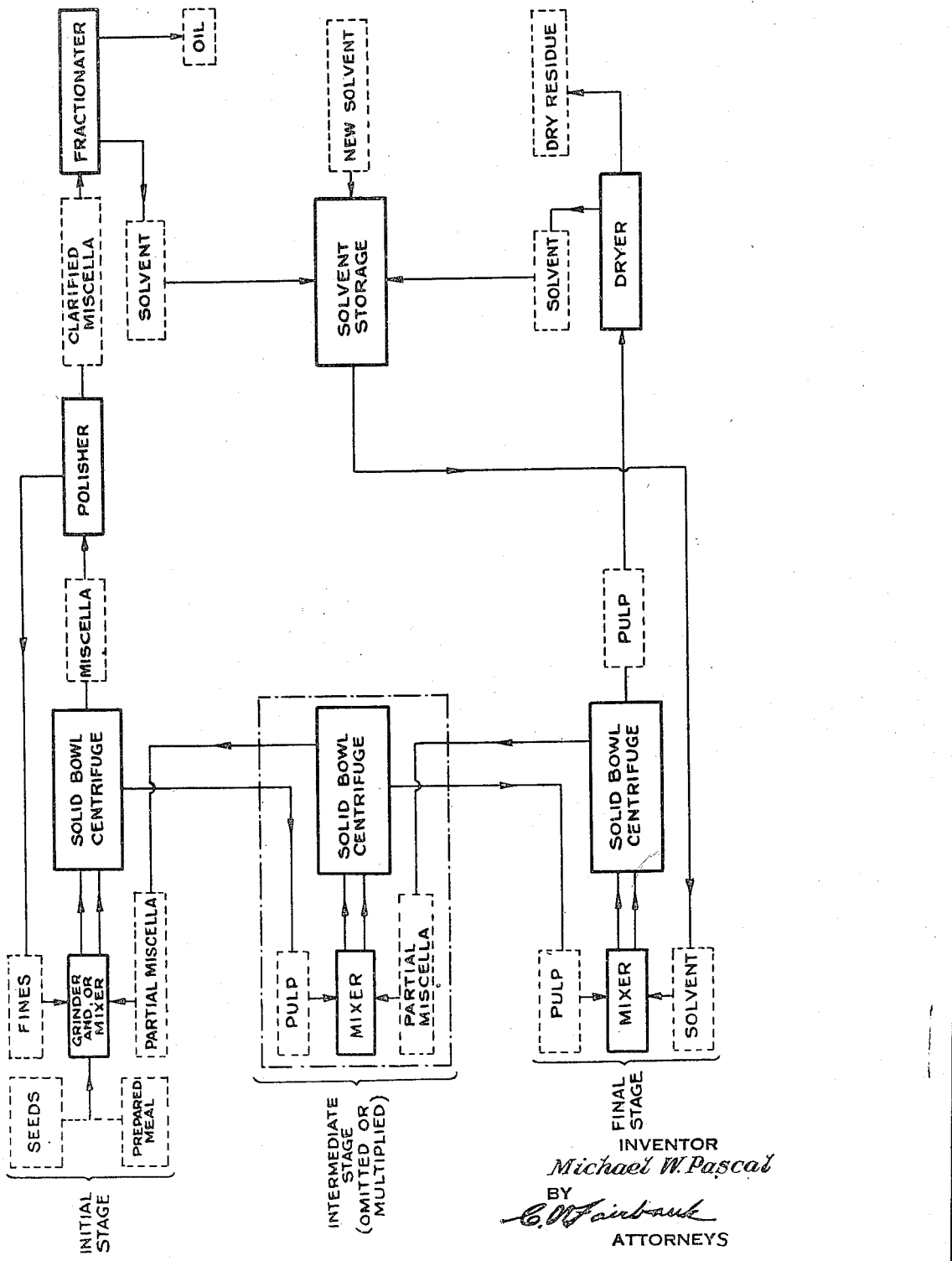

2,467,404

UNITED STATES PATENT OFFICE 2,467,404

SOLVENT EXTRACTION OF VEGETABLE OILS

Michael W. Pascal, Shaker Heights, Ohio, assignor to The Sherwin-Williams Company, Cleveland, Ohio, a corporation of Ohio Application February 7, 1946, Serial No. 646,034

14 Claims. (Cl. 260—412.4)

This invention relates to an improvement in the continuous solvent extraction of vegetable oils and, more particularly, to the continuous over-all counter-current solvent extraction of oils from oil-containing seeds, nuts, and beans which tend to disintegrate and produce a loose, finely particled pulp when prepared and treated with oil solvents.

Processes for the extraction of soluble substances from various materials by counter-current solvent methods are well known. Such counter-current processes have been employed with considerable success for the extraction of oil from soya beans after suitable preparation, as by grinding and flaking, which effects a fairly coarse flaked product reasonably resistant to mechanical handling. The successful solvent extraction of oil from soya beans with conventional processes is believed to be due to both the high proportion of protein in the bean and the cellular structure of the bean. Upon heating, the cracked soya bean becomes plastic, permitting cracked portions of the bean to be rolled out into the form of thin curved flakes; such thin, curved flakes permit both the easy diffusion of the solvent through each flake and the easy percolation of solvent through a mass of flakes. Apparently the oil of the soya bean is contained almost entirely within the cells and, when the solvent diffuses through the soya flakes, the oil in the cells is simply displaced by a micella of oil and solvent without disrupting the cellular structure of the thin flakes.

Commercially important oil-containing seeds, beans, and nuts (generically referred to hereinafter as "seeds"), such as linseed, cottonseed, castor bean, perilla, sunflower seed, hempseed, peanut, oiticica, tungnut, coconut, and the like, do not possess the physical characteristics requisite for forming them into durable, thin, curved flakes which will not disintegrate during the extraction process. Such oil-containing seeds other than soya beans simply disintegrate when treated with a solvent for the oil after mechanical grinding or crushing. In the slurry formed by such disintegrated seeds and the miscella of oil and solvent, a portion of the seed solids may remain in the form of more or less separate fibers (rather than as fibrous cellular structures) but in all cases substantial portions of the seed solids exist as small solid fines dispersed in an actual or substantially colloidal suspension. Heretofore such fine particles would follow the miscella directionally in a solvent extraction system. Because such fine particles would retain a large amount of attached oil, special processing to remove such fines from the miscella, as by successive filtering operations would also remove substantial quantities of oil, thus defeating the purpose of the process.

The art has long sought a practical continuous solvent extraction method for oil-containing seeds other than soya beans. The advantages of the solvent extraction of soya beans are many, the principal advantages being that a greater proportion of high grade oil is obtained and extraction of the oil from the solids is more nearly complete. By so extracting a greater proportion of oil from the solids, the proportion of proteins in the resulting meal is increased, thereby increasing the value of the meal as cattle feed. Thus, the art has been aware that solvent extraction of oil from oil-containing seeds other than soya beans could probably produce a greater proportion of high grade oil and a more valuable meal, if one could first discover a practical method of producing in the extraction system a miscella substantially free from fine solids and not requiring special processing. It is the object of this invention to provide such a method.

In many arts, the separation of two or more solid materials is obtained by utilization of a difference in particle size, as by screening, or, where one of the materials is a liquid, by filtering in a pressure, vacuum, or centrifugal (perforate bowl) filter. In other arts, separation is obtained by utilization of differences in the specific gravities, as by centrifuging in a solid bowl centrifuge or by allowing the heavier components to settle in a gravity settler or a mechanical thickener.

None of the above general procedures suggested a solution to the problem of separating out the solids of seeds which disintegrate upon contact with a solvent after suitable trituration, since the slurries so formed contain solids varying in size from discrete hulls and fibers to colloidal fines forming floating, indiscrete gelatinous masses having specific gravities equal to or possibly even slightly less than the specific gravity of the suspending miscella. In the usual pressure or vacuum filters the solids of oil-containing seed which disintegrate upon trituration and contact with solvent substantially completely clog the filter almost simultaneously with the establishment of effective filtering, due to the substantial quantity of gelatinous material in combination with discrete, solid particles in the slurry. Likewise, the usual perforate bowl type of centrifuge, also termed a centrifugal filter, fails by first passing a substantial quantity of the fines and then rapidly clogging. Similarly, gravity or mechanical thickeners fail to effect separation of a ground linseed slurry, for example; such thickeners are expected to effect separation of solids and liquids by a slow settling of the solids under the influence of gravity, aided, in the case of mechanical thickeners, by the floccule-breaking action of the rakes. In these thickeners, however, the solids of such slurries, after a slight settling, form in the miscella such a thorough system of interdispersed hulls, fibers, and gels of colloidal fines that further settling is not obtained; rather than breaking up such floccules as are formed and allowing the miscella and the lighter fines to escape from such floccules, the rake tends to carry the entire system of miscella and dispersed fines along with it. I have discovered, however, that a solid bowl centrifuge is operative to effectively separate out the suspended solids in a slurry formed by the disintegration of the seeds in question when contacted by a solvent. However, I believe its operativeness is not due, at least not initially or entirely, to the magnification of normally insignificant differences in the specific gravities of the fines and miscella, as might be expected, for the action of a linseed slurry in a mechanical thickener shows that a substantial portion of the disintegrated solids form gels or floccules which have a specific gravity effectively equal to the miscella in which such solids are dispersed. Rather, I believe the operativeness of a solid bowl centrifuge in separating a clear miscella from such slurries is due to the fact that both the liquid miscella and the dispersed floccules are forced toward and along the wall of a solid bowl centrifuge; because of this force on the floccules themselves and the ability of the less viscous liquid in and between the floccules to flow toward and along the wall, the floccules are compacted, this compacting, of course, increasing the density of the floccules. Also, the miscella is not required to pass through an accumulating body of solids, as in the case of filters.

I have thus discovered that the tendency for the fine particles of prepared oil-containing seeds to follow the solvent directionally in an overall counter-current system is materially lessened or entirely overcome by repetitively and con-currently extracting the oil from oil-containing material with a solvent or partial miscella to produce a slurry and then treating the slurry with a solid bowl type of centrifuge to establish two separable components, a substantially solid-free miscella and a compacted pulp in which the proportion of solvent or partial miscella to seed solids has been greatly reduced. These components are then separated and move counter-current to each other in the system.

It is to be understood, of course, that my process, which is operative for the solvent extraction of difficultly extractable seeds, such as linseed, is also operative for the solvent extraction of seeds, such as soya beans, which permit separation of seed solids from the miscella by a simple filtering operation.

In carrying out my invention I repeat a series of steps as many times as may be necessary to effect 98% or better extraction of the oil and to leave a residue of extracted solids containing less than 1% of oil. Each such series of steps or stages comprises, in the main, (1) mixing, in an established proportion, an oil-containing mass of comminuted seed solids suspended in partial miscella obtained from the succeeding stage to form a slurry in which oil is extracted from the seed solids by diffusion into the partial miscella, except, of course, that in the initial stage the comminuted mass of seed solids may be either seeds ground into the miscella or previously prepared seed meal and in the final stage solvent is used instead of partial miscella, (2) centrifuging the slurry so formed in a solid bowl type of centrifuge to form two separable components, a solid free miscella and a pulp of miscella and thickened and compacted seed solids, and (3) separating the solid-free miscella from the pulp, passing the pulp to a succeeding stage (except in the final stage) and passing the miscella to a preceding stage (except in the initial stage). While the movement of solids and partial miscella or solvent is con-current or substantially so during each stage, the overall movement, in my process, of oil-containing material (introduced at the initial stage) and solvent (introduced at the final stage) is thereby established as counter-current. The number of repeated stages necessary may vary from two to six or more, but ordinarily I have found that three stages will extract 98% or better of the available oil, producing a residue of solids containing less than 1% of oil and a miscella at the most clouded with only a minor amount of suspended fine particles. Such cloudiness in the miscella is easily removable by a simple "polishing" filter and the fines, causing cloudiness and so removed, are returnable to the extraction system to obtain the oil therein.

In order to explain my process more clearly, reference is made to the accompanying diagrammatic flow sheet showing a series of three repeated stages of concurrent extracting, thickening, and compacting in an overall counter-current system. In the accompanying flow sheet, the several pieces of apparatus are shown by the labeled rectangles delineated in heavy solid lines, while the light dotted line rectangles are labels for the arrows indicating the flow of materials in the system. The parallel double arrows from each mixer to a thickener and compacter simply indicate con-current movement of liquids and solids in the slurry flowing from a mixer to a thickener and compacter; the dotted arrows from the boxes showing "seed" or "prepared meal" to the "grinder and/or mixer" of the first stage indicate the alternative or conjoint use at this stage of a grinder which grinds seed into the partial miscella or a mixer which thoroughly disperses previously prepared seed meal into the partial miscella.

At the initial stage it is preferable to grind certain seeds, such as flaxseed or decorticated castor kernels, directly into the partial miscella obtained from the second stage, for it has been found that such practice may effect a more rapid grinding of the seeds and a more thorough dispersion of the ground seed meal into the partial miscella. Any kind of seed may, of course, be treated prior to contact with the extracting partial miscella, as by decorticating, steaming, cooking, drying, moistening, grinding, shredding, flaking, comminuting or triturating; such prior treatment may also include the step of removing a portion of the oil, as by expression.

It is in the formation of the slurries in the mixers of the several stages that the oil is extracted by diffusion into the partial miscella forming the oil-rich final miscella from which the extracted oil is later obtained. Accordingly, the mixing vessels are preferably equipped with coils, jackets or other heating devices and insulated in order that an optimum extracting temperature may be maintained, this optimum varying according to the solvent employed, as is well known in the art. Thus, for example, with linseed meal and hexane as the solvent, room temperatures are quite satisfactory, but with castor bean and heptane as the solvent, a temperature of 50° C. or higher is desirable for efficient extraction.

The slurry formed in the mixing vessels at the initial stage is withdrawn to the solid bowl type of centrifuge at a rate to balance the input of seed or meal and partial miscella and to maintain an average constant volume in the mixing vessels. The solid bowl centrifuge employed is preferably of the continuous type, such as the Bird centrifugal thickener, which receives the slurry continuously and continuously discharges both the separated solid free miscella and the thickened pulp of compacted solids and miscella. One may employ other solid bowl types of centrifuges, such as the Quiroz continuous centrifuge, which continuously receives the slurry and discharges the miscella while intermittently but automatically discharging the pulp, the operating efficiency and production capacity of the solid bowl centrifuge decreasing, in general, as the continuity of flow through the centrifuge decreases.

The liquid fraction or miscella from the solid bowl centrifuge in the initial stage is run through a polishing press to remove any fine suspended particles which may be present in a minor amount as cloudiness in the miscella. The fines so removed may be returned to the system, at any point, preferably into the mixer in the initial stage. The clarified miscella is then treated in a fractionator by known fractionating processes, as by heat, usually while bubbling dry steam or inert gas therethrough and at a temperature sufficient to drive off the solvent in vapor form. The distilled solvent vapors are condensed and flow to solvent storage for reuse in the system. The thus extracted oil is withdrawn from the fractionator for use as raw oil.

The pulp separated from the oil-rich miscella in the solid bowl centrifuge in the initial stage of the system is comprised of seed solids which may contain an appreciable amount of unextracted oil and oil-rich miscella, the effect of the separation obtained in the solid bowl centrifuge in the initial stage being to produce a substantially solid-free, oil-rich miscella and not miscella-free seed solids. It is for the purpose of recovering the oil in the appreciably oil-rich pulp produced in the initial stage that a plurality of stages are used in my system. The amount of oil extracted at any one stage depends upon a number of solubility factors, principally the effectiveness of the particular solvent employed for the oil being extracted and the proportion of extracting liquid (i. e. partial miscella or oil solvent) to the oil-containing meal or pulp. The proportion of meal or pulp to extracting liquid automatically balances throughout the system, being controlled by the quantity of meal fed into the initial stage and the solvent admitted at the final stage. The overall ratio of meal to solvent is not critical and may vary over wide limits. In practice I have found that the ratio calculated to yield a miscella of 15–30% of oil is generally satisfactory. In extracting a high consistency oil such as castor, a final miscella of about 20% to 25% is preferred whereas with linseed a miscella of 25–30% or even higher may be used if desired. The higher the ratio of solvent to meal, the better the extraction and the lower the oil content of the residues with a given number of series of operations, but on the other hand, the increase in solvent ratio results in a greater amount of solvent to be evaporated in fractionating the miscella to obtain the pure oil and drive off the solvent. For example, with linseed meal prepared by drying, crushing and cooking and containing 38% of oil, a feed ratio of 114 parts by weight of hexane to 100 parts by weight of meal may be employed, the resulting miscella then containing approximately 25% oil. With decorticated castor kernels containing about 65% of oil, 260 parts of heptane to each 100 parts of kernels results in a miscella of about 20% oil.

As shown in the accompanying flow sheet of a three-stage system, pulp from the solid bowl centrifuge of the initial stage is fed into a mixer in a second stage along with an oil-dilute partial miscella obtained from the succeeding and final stage. In the slurry thus formed, the partial miscella is enriched with oil and the slurry is fed to the second stage solid bowl centrifuge, where the slurry is thickened and compacted to form a less oil-rich pulp and an oil-enriched partial miscella, similar to the separation of pulp and miscella in the initial stage. The separated oil-enriched partial miscella from the second stage is fed to the mixer in the initial stage and the increasingly extracted pulp is fed to the succeeding stage, in this instance, the final stage. As should be apparent from the arrows indicating the counter-current flow of miscella and pulp between stages, this described intermediate stage may be omitted altogether if a two-stage system is desired, or successive additional intermediate stages may be added if a greater number of stages in a multi-stage system is desired. The total number of stages desirably employed depends upon several factors, the operating effectiveness and efficiency of the particular thickening and compacting equipment employed in separating a solid-free miscella or partial miscella from the pulp produced and the diminishing returns as affected by plant investment and operating costs, on the one hand, and solvent investment and fractionating costs, on the other. Thus, in a two-stage system, equipment and operating costs therefor are at a minimum but a large volume of solvent, proportional to the volume of oil extracted, must be employed and distilled if effective extraction is to be obtained. If more than two stages are employed, a richer final miscella may be obtained and, thus, the cost of distilling the solvent for a given volume of extracted oil may be reduced but the investment in the additional equipment and the operating costs therefor will be increased.

In the final stage of my system the pulp, which is rather thoroughly depleted of oil, is mixed with oil-free solvent from the solvent storage and centrifuged to produce a relatively oil-poor partial miscella and a pulp comprised of substantially oil-free residual seed solids and the oil-poor partial miscella. To recover the solvent in such final pulp and to produce a solvent-free residue which may be valuable as cattle feed and the like, the final pulp is passed through a dryer, the evaporated solvent being condensed and returned to solvent storage for reuse in the system.

With an efficient number of successive stages, proper solvent, preparation of the meal, temperature, and flow rates, these residual solids should run no more than 1% oil and may usually be obtained with an oil content around 0.5% or even less.

Any losses of solvent may be made up by addition of new solvent to the solvent storage and the rate of flow of solvent from solvent storage to the mixer at the final stage is proportioned to the rate at which meal is fed into the mixer at the initial stage, as previously described. The selection of a suitable solvent for any particular oil-containing material is more or less arbitrary. A considerable number of liquids have been proposed for use as oil or fat solvents in extraction systems, and many have considerable merit. In commercial practice low boiling hydrocarbons or halogenated hydrocarbons, or alcohols are customarily employed. Any of the oil solvents or combinations of solvents which work satisfactorily upon a specific oil-containing material in a batch system will work equally well in my process. A suitable solvent should have the property of rapid penetration of the meal particles and rapidly dissolving or extracting the oil. It must also be easily removable from both the miscella and the residual-slurry fraction, leaving both the oil and the residue in satisfactory form for direct use or further processing.

While specific examples of the use of this process on flaxseed using hexane as solvent and castor bean with heptane as solvent have been given herein, I do not limit either the oil-containing material nor the solvent to these combinations. By "hexane" and "heptane" I intend any of the available commercial grades of these hydrocarbons or mixtures containing a substantial proportion of hexane or heptane with other related hydrocarbons present, sometimes in rather considerable amount. This invention may be modified and varied by those skilled in the art without departing from the scope of my invention as defined in the following claims. In the following claims the step of preparing the seed meal is to be understood to include the step of grinding the seeds directly into the solvent or partial miscella as well as treating the seed, as by trituration, prior to contacting the seed solids with the solvent or partial miscella. Likewise, in the specification, the term "solid bowl centrifuge" is to be understood to include the continuous centrifuges in which both the miscella and pulp are continuously discharged as well as the centrifuges in which the miscella is continuously discharged and the pulp is intermittently but automatically discharged.

What is claimed is:

1. The multi-stage over-all counter-current solvent extraction of oil from seeds comprising the steps, in an initial stage, of dispersing oil-containing seed solids in an extracting liquid containing a solvent for the oil to form a slurry, thickening and compacting the seed-solids of the slurry upon an imperforate surface while subjecting the slurry to centrifugal force to produce a substantially solids-free miscella, and separating said substantially solids-free miscella from the thickened and compacted seed solids, and the further steps of moving seed solids and extracting liquid counter-current between stages.

2. The method of solvent extracting oil-containing seeds in repeated concurrent stages, comprising in each stage the steps of dispersing triturated oil-containing seed solids in an extracting liquid containing a solvent for the oil to form a slurry and then compacting the seed solids of the slurry upon an imperforate surface while subjecting the slurry to centrifugal force to separate the slurry into a substantially solids-free miscella and a thickened pulp of said solids and miscella, and the further steps of moving pulp and extracting liquid counter-current between stages.

3. The method of solvent extracting oil-containing seeds comprising the steps of triturating the seeds to form an oil-containing mass of seed solids, treating the mass of seed solids in repeated concurrent stages, each stage comprising the steps of dispersing the solids in an extracting liquid containing a solvent for the oil to form a slurry and then compacting the seed solids of the slurry upon an imperforate surface while subjecting the slurry to centrifugal force to separate the slurry into a substantially solids-free miscella and a compacted pulp comprised of said solids and miscella, and the further steps of moving pulp and extracting liquid counter-current between stages.

4. The multi-stage over-all counter-current solvent extraction of oil from oil-containing seeds comprising the steps of triturating the seeds to form an oil-containing mass of seed solids, treating the seed solids in stages by mixing the seed solids with an extracting liquid containing a solvent for the oil to form a slurry of seed solids and extracting liquid, said extracting liquid being obtained from a succeeding stage, except in the final stage, separating said seed solids from the slurry in the initial stage by thickening and compacting the seed solids in said slurry upon an imperforate surface while subjecting the slurry to centrifugal force to separate a substantially solids-free miscella and to form a compacted pulp, separating solvent from the oil in the substantially solids-free miscella obtained from the initial stage to produce a substantially solvent and solids-free oil, in the final stage mixing said solvent with compacted pulp from a preceding stage to form a slurry of solids and partial miscella, separating said solids from the slurry in the final stage by thickening and compacting the solids, introducing partial miscella obtained from the final stage into a preceding stage, evaporating solvent from the compacted solids obtained from the final stage to produce a substantially oil and solvent free residue of seed solids, recovering said evaporated solvent and returning such recovered solvent to solvent to be mixed with pulp in the said final stage.

5. The method as defined in claim 4 in which the amount of solvent introduced in the final stage is proportioned to the amount of seed solids introduced in the initial stage to produce a miscella containing from fifteen to thirty percent of oil.

6. The multi-stage solvent extraction of oil from oil-containing seeds tending to disintegrate into fine particled pulps when triturated and treated with solvents comprising the steps, at the initial stage, of preparing a meal of oil-rich seed solids from said oil-containing seeds and mixing said meal with partial miscella, obtained from a succeeding stage, to form a slurry, thickening and compacting the seed solids upon an imperforate surface, while subjecting the slurry to centrifugal force, to separate the slurry into a substantially solids-free final miscella and a pulp of seed solids and miscella; thereafter mixing a pulp of seed-solids obtained from a preceding stage and partial miscella from a succeeding stage, and then separating oil-depleted pulp and oil-enriched partial miscella by thickening and compacting the pulp, except in the final stage in which solvent, instead of a partial miscella, is mixed with compacted pulp.

7. The multi-stage extraction of linseed oil from flaxseed comprising the steps in the initial stage of forming an initial slurry of comminuted flaxseed and a partial miscella comprised of linseed oil and a solvent therefor obtained from a succeeding stage, and then thickening and compacting the flaxseed solids in said slurry upon an imperforate surface, while subjecting the slurry to centrifugal force and moving said compacted solids along said surface to separate the slurry into a substantially solids-free miscella and a compacted pulp of flaxseed solids and miscella; thereafter mixing compacted pulp obtained from a preceding stage with the solvent to form a final slurry, separating a substantially solids-free partial miscella while thickening and compacting the flaxseed solids in the final slurry, and regulating the amount of solvent introduced in the final slurry to the amount of meal introduced in the initial slurry to obtain from the initial slurry a miscella containing from twenty to thirty percent of linseed oil.

8. The process as defined in claim 7 in which the solvent is hexane.

9. The multi-stage extraction of castor oil from castor beans comprising the steps, in the initial stage of forming an initial slurry of comminuted castor beans and a partial miscella comprised of castor oil and a solvent therefor obtained from a succeeding stage, thickening and compacting the castor bean solids in the slurry against an imperforate surface, while subjecting the slurry to centrifugal force, and continuously moving said compacted solids along said surface to separate the slurry into a substantially solids-free miscella and a compacted pulp of castor bean solids and miscella; thereafter mixing the compacted pulp obtained from a preceding stage with the solvent to form a final slurry in the final stage, separating a substantially solids-free partial miscella while thickening and compacting the castor bean solids in the final slurry, regulating the amount of solvent introduced in the final slurry to the amount of meal introduced in the initial slurry to obtain from the initial slurry a miscella containing from fifteen to twenty-five percent castor oil, and maintaining the slurries throughout the stages at temperatures not substantially less than 50° C.

10. The process as defined in claim 9 in which the solvent is heptane.

11. The art of solvent-extracting oil from oil-containing seed solids comprising the steps of repeatedly treating the seed solids in successive stages, each stage comprising the steps of mixing seed solids and an extracting liquid containing a solvent for the oil to form a slurry, separating the slurry by subjecting the slurry to impact against an imperforate surface, while subjecting the slurry to centrifugal force, to form a substantially solids-free oil-enriched liquid and a thickened and compacted pulp and continuously moving said liquid and compacted pulp in opposite directions along said surface, said process including the steps of introducing oil-rich seed meal into the initial stage and moving the solids thereof through successive stages until removed as oil-depleted seed solids from the final stage, circulating a solvent for the oil from solvent storage into the final stage and between stages counter-current to the movement of seed solids to produce an increasingly oil-enriched miscella which is removed from the initial stage, removing solvent from the final oil-enriched miscella, and returning said removed solvent to solvent storage for recirculation.

12. The multi-stage over-all counter-current method of extracting oil from oil-containing seeds comprising in each of a plurality of stages the steps of: (1) forming a slurry of triturated seed solids and an extracting liquid containing a solvent for the oil and (2) thickening and compacting the seed solids of the slurry upon an imperforate surface while subjecting the slurry to centrifugal force and continuously withdrawing miscella therefrom to separate the slurry into a substantially solids-free miscella and a thickened pulp; said method further comprising introducing seed solids into the first stage, moving thickened pulp between stages from the first stage to the final stage for repeated extraction of oil therefrom, and removing thickened pulp from the final stage and recovering solvent therefrom to produce a substantially oil-free and solvent-free residue; introducing extracting liquid into the final stage, moving a partial miscella of solvent and extracted oil between stages from the final stage to the first stage for repeated use as extracting liquid, removing miscella from the first stage and separating solvent therefrom to produce a substantially solvent-free and solids-free oil, and returning said separated solvent to the extracting stages.

13. The process as defined in claim 12 in which the oil-containing seeds are flaxseed and the solvent is hexane.

14. The process as defined in claim 12 in which the oil-containing seeds are castor beans and the solvent is heptane.

MICHAEL W. PASCAL.

REFERENCES CITED

The following references are of record in the file of this patent:

UNITED STATES PATENTS

| Number | Name | Date |
| --- | --- | --- |
| 427,410 | Forbes | May 6, 1890 |
| 1,503,751 | Dreymann | Aug. 5, 1924 |
| 1,553,162 | Hiller | Sept. 8, 1925 |
| 1,865,615 | Coleman | July 5, 1932 |
| 2,164,189 | Hund et al. | June 27, 1939 |
| 2,183,837 | Hamilton et al. | Dec. 19, 1939 |
| 2,308,559 | Winkler | Jan. 19, 1943 |
| 2,377,136 | Dinley et al. | May 29, 1945 |

OTHER REFERENCES

Chemical and Met. Engineering, July 1943, pages 119 to 126.

Markley et al., Soybean Chemistry and Technology (1944), Chem. Pub. Co., page 191.